(12) United States Patent
Williams

(10) Patent No.: US 6,892,315 B1
(45) Date of Patent: May 10, 2005

(54) ADJUSTABLE MICROCONTROLLER WAKE-UP SCHEME THAT CALIBRATES A PROGRAMMABLE DELAY VALUE BASED ON A MEASURED DELAY

(75) Inventor: Timothy J. Williams, Bellvue, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/577,861

(22) Filed: May 24, 2000

(51) Int. Cl.[7] ................................................. G06F 1/14
(52) U.S. Cl. ....................... 713/502; 713/323; 327/276; 377/118
(58) Field of Search ................................ 713/502, 323; 327/393, 276; 377/52, 118

(56) References Cited

U.S. PATENT DOCUMENTS

| | | | | |
|---|---|---|---|---|
| 4,193,539 A | * | 3/1980 | Bowman et al. ............... | 377/46 |
| 4,327,328 A | * | 4/1982 | MacDonald ................. | 327/393 |
| 5,049,766 A | * | 9/1991 | van Driest et al. ......... | 327/269 |
| 5,128,938 A | * | 7/1992 | Borras ......................... | 370/311 |
| 5,155,451 A | * | 10/1992 | Gladden et al. ............. | 331/1 A |
| 5,454,114 A | * | 9/1995 | Yach et al. .................. | 713/330 |
| 5,664,205 A | * | 9/1997 | O'Brien et al. .............. | 713/322 |
| 5,670,904 A | * | 9/1997 | Moloney et al. ............. | 327/277 |
| 6,025,745 A | * | 2/2000 | Lee et al. ..................... | 327/277 |
| 6,128,747 A | * | 10/2000 | Thoulon ...................... | 713/330 |
| 6,229,367 B1 | * | 5/2001 | Choudhury .................. | 327/276 |
| 6,281,721 B1 | * | 8/2001 | Kinget et al. ................ | 327/115 |
| 6,357,012 B1 | * | 3/2002 | Aab ............................. | 713/322 |

OTHER PUBLICATIONS

IBM Technical Disclosure Bulletin, vol. 37 No. 3 pp. 53–56, Mar. 1994, "Programmable Delay Line".*
IBM Technical Disclosure Bulletin, vol. 37, No. 8, Aug. 1994, "Programmable Delay Line Control Signal Circuits".*
Philips Semiconductors, "74HC/HCT5555 Programmable delay timer with oscillator", Sep. 1993.*
Horowitz & Hill, The Art of Electronics, Cambridge University Press, Second Edition, Chapter 10, pp. 673–674, 1999.*

* cited by examiner

Primary Examiner—Thomas Lee
Assistant Examiner—Albert Wang
(74) Attorney, Agent, or Firm—Christopher P. Maiorana, PC

(57) ABSTRACT

An apparatus comprising a first circuit and a second circuit. The first circuit may be configured to wake-up the second circuit in response to an input signal. The input signal generally comprises a programmable delay value.

25 Claims, 1 Drawing Sheet

ADJUSTABLE MICROCONTROLLER WAKE-UP SCHEME THAT CALIBRATES A PROGRAMMABLE DELAY VALUE BASED ON A MEASURED DELAY

FIELD OF THE INVENTION

The present invention relates to a method and/or architecture for wake-up schemes generally and, more particularly, to a method and/or architecture for an adjustable microcontroller wake-up scheme.

BACKGROUND OF THE INVENTION

Conventional methods and/or circuits for wake-up schemes are based on a fixed delay element. The fixed delay element is implemented either on-chip or off-chip. One such conventional method implements an R-C charging circuit configured to cause the wake-up event (e.g., generation of an interrupt). Another such conventional method implements a free-running low power oscillator.

Conventional off-chip timers (i) require additional pins on the microcontroller device and (ii) require external components (e.g., R-C charging circuit). Conventional on-chip timers (i) are not accurate, (ii) lack a mechanism to improve accuracy, (iii) require several cycles of wake-up and re-suspend for long delays and (iv) have high power consumption. Additionally, both off-chip and on-chip timers have limited wake-up time ranges.

SUMMARY OF THE INVENTION

The present invention concerns an apparatus comprising a first circuit and a second circuit. The first circuit may be configured to wake-up the second circuit in response to an input signal. The input signal generally comprises a programmable delay value.

The objects, features and advantages of the present invention include providing a method and/or architecture for implementing a wake-up scheme that may (i) provide an internal solution for causing the wake-up of microcontrollers by moving from a suspend or sleep mode, (ii) implement relatively long target times (e.g., up to hundreds of milliseconds or more), (iii) implement a range of wake-up times and/or (iv) provide increased accuracy.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
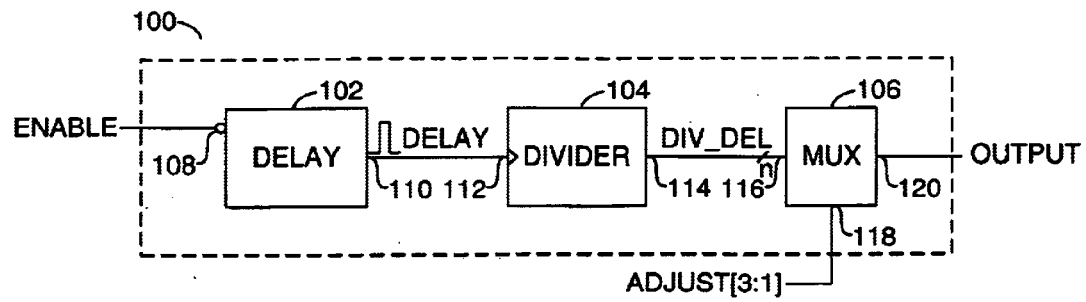
FIG. 1 is a block diagram of a preferred embodiment of the present invention.

Referring to FIG. 1, a block diagram of a circuit 100 is shown in accordance with a preferred embodiment of the present invention. In one example, the circuit 100 may be implemented as a user programmable wake-up timer. The circuit 100 may implement a programmable wake-up timer that may be used with a processing device, such as a microprocessor or a microcontroller, to control the exiting of a suspend or sleep mode. The circuit 100 may also allow variations in the wake-up time (that may result from processing or operating conditions) to be tuned out. The circuit 100 may allow a user to program a delay value for a wake-up operation. The circuit 100 may have a low-power consumption and may operate in a low-power suspended state without requiring any additional pins or external components.

The circuit 100 may provide a periodic wake-up indication. The circuit 100 may provide the periodic wake-up indication to allow a device (e.g., a computer) to respond to an event (e.g., push of a button or mouse movement). A timing of the wake-up indication may be programmed by a user. The circuit 100 may allow for significant variation and/or adjustment of the wake-up time for different users/applications. The circuit 100 may provide a reasonable accuracy in sleep time (e.g., efficient use of suspend mode power budget). In the example of a Universal Serial Bus (USB) microcontroller, an average current of less than 500 uA during suspend may be implemented. However, other suspend currents may be implemented accordingly to meet the design criteria of a particular implementation. Additionally, the circuit 100 may be configured to operate between two operating modes. For example, the circuit 100 may operate under any power conditions between a full operation mode and a sleep (or suspend) operation mode (e.g., between (i) a low speed/high speed mode, (ii) a low power/high power mode, etc.). The circuit 100 may eliminate pins previously used for external wake-up components.

The structure of the circuit 100 may comprise a delay block (or circuit) 102, a divider block (or circuit) 104 and a multiplexer block (or circuit) 106. In one example, the divider block 104 and the multiplexer block may be implemented as a single select block (or circuit). The delay block 102 may have an input 108 that may receive a signal (e.g., ENABLE). Additionally, the delay block 102 may have an output 110 that may generate a signal (e.g., DELAY). The signal ENABLE may initiate the generation of the signal DELAY by the delay block 102. The signal DELAY may be presented to an input 112 of the divider block 104.

The divider block 104 may have an output 114 that may generate n number of signals (e.g., DIV_DEL), where n is an integer. The signals DIV_DEL may be implemented, in one example, as divided delay signals. The divided delay signals DIV_DEL may be presented to an input 116 of the multiplexer 106. The multiplexer 106 may have an input 118 that may receive a signal (e.g., ADJUST[3:1]). In one example, the signal ADJUST[3:1] may be implemented as a multi-bit signal. In another example, the signal ADJUST[3:1] may be implemented as a user programmable input signal.

The multiplexer 106 may have an output 120 that may generate a signal (e.g., OUTPUT). In one example, the signal OUTPUT may be implemented as a wake-up signal. However, the signal OUTPUT may be implemented as another appropriate signal in order to meet the criteria of a particular implementation. The multiplexer 106 may multiplex the divided delay signals DIV_DEL in response to the signal ADJUST[3:1]. The circuit 100 may provide an internal timer with range selection and calibration capability.

In one example, the delay block 102 may be implemented as an analog delay circuit. In another example, the delay circuit 102 may be implemented as a current charging a capacitor, a ring oscillator, and/or a R-C delay time. However, the delay block 102 may be implemented as other types delay devices in order to meet the criteria of a particular implementation. The delay circuit 102 may be implemented as a slow-charging circuit having minimal power consumption. The delay block 102 may be configured to provide a baseline delay time (e.g., the signal DELAY). The signal DELAY and, therefore, the delay time of the circuit 100 may typically have a wide variation in an integrated circuit application. The variation of the signal DELAY is generally dominated by silicon processing variations in the fabrication of the integrated circuit containing the circuit 100.

Figure 2:
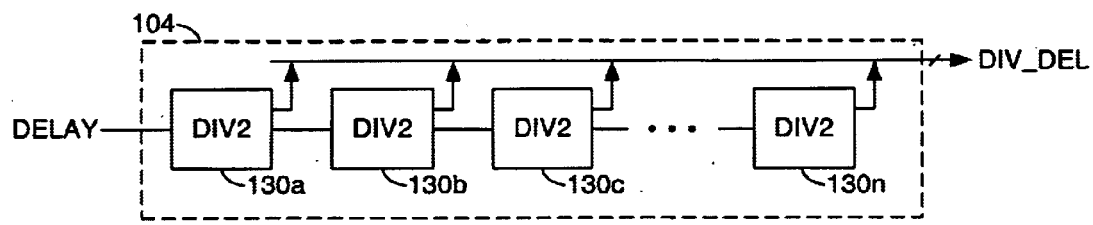
FIG. 2 is a detailed block diagram of a divider circuit of FIG. 1.

Referring to FIG. 2, a detailed block diagram of the divider block 104 is shown. The divider block 104 generally comprises a number of divide blocks (or circuits) 130a–130n. The divide blocks 130a–130n may be implemented, in one example, as divide by 2 dividers. However, the divide blocks 130a–130n may each be implemented as another appropriate divider in order to meet the criteria of a particular implementation. The divide blocks 130a–130n may be connected in series. The divide block 130a may receive the signal DELAY. The divide block 130a may present a divided output signal to the divide block 130b. Each of the divide blocks 130b–130n may receive a divided output from a proceeding divide block 130a–130n.

Additionally, each of the divide blocks 130a–103n may be connected to the divided delay signal DIV_DEL. Each of the divide blocks 130a–130n may be configured to generate at least one divided clock signal of the divided delay signal DIV_DEL. The divided clock signals may be presented as the divided delay signal DIV_DEL.

The divider circuit 104 may be implemented to extend a delay range of the circuit 100. The divider block 104 may divide the signal DELAY into the multiple divided signals DIV_DEL. In one example, the divider 104 may be implemented as a ripple divider circuit. However, the divider circuit 104 may be implemented as other appropriate delay devices in order to meet the criteria of a particular implementation. The multiplexer 106 may multiplex the divided delay signals DIV_DEL in response to the signal ADJUST[3:1]. The multiplexer 106 may tune the signal OUTPUT in response to the signal ADJUST[3:1].

The signal ADJUST[3:1] may be implemented, in one example, as a 3-bit signal. However, the signal ADJUST[3:1] may be implemented as other appropriate bit-width signals to meet the criteria of a particular implementation. The circuit 100 may provide a number of wake-up times (e.g., the multiple delay signals DIV_DEL) with respect to an initial delay time (e.g., the signal DELAY). The signal ADJUST [3:1] may allow the number of the wake-up times. The wake-up timer of the circuit 100 may be programmed by the signal ADJUST[3:1]. However, the circuit 100 may be programmed in a number of alternate ways such as (i) pins configured to store a delay value, (ii) data pins configured to receive a delay value, (iii) loading in a delay value from a register, (iv) coding a delay value in microprocessor code, and/or (v) coding a delay value in firmware. However, the circuit 100 is not limited to the programming methods as described.

The circuit 100 may tune out variation from process (and possibly operating conditions). The circuit 100 may allow a processor to automatically choose a range closest to a target sleep period (via the signal ADJUST[3:1]).

In general, once the signal ENABLE is asserted, the delay block 102 may generate the signal DELAY. The signal DELAY is generally presented to the divider block 104. The divider 104 may present the divided delay signals DIV_DEL to the multiplexer 106. The multiplexer 106 may generate the signal OUTPUT in response to the signal ADJUST[3:1] and the signals DIV_DEL. The signal ADJUST[3:1] may allow configuration of a number of delay counts of the circuit 100. The signal OUTPUT may be implemented as a wake-up signal (e.g., an interrupt) to bring the device out of sleep or suspend mode.

The various signals are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The wake-up time is generally adjusted by a programmable number of control bits of the signal ADJUST[3:1]. The number of, as well as the control bits themselves, may be programmed by a user or by appropriate firmware. In one example, the number of control bits may be 3. However, other numbers of control signals may be implemented accordingly to meet the design criteria of a particular implementation. In the example of 3 control bits, 8 possible wake-up times may be implemented. Each of the 8 choices of wake-up times, in one example, may increase the delay time by a factor of 2 times longer than the time delay of the previous setting. For example, the wake-up delay times may have settings of 1×, 2×, 4×, 8×, 16×, 32×, 64×, and 128× greater than the default delay. The default delay is typically a convenient wake-up time and/or the fastest wake-up time allowable.

In one example, a default delay time of 3 ms may be defined. Operating condition delays of the device typically vary between 1 ms and 5 ms from the baseline delay (e.g., 3 ms) of a particular chip. To generate a 100 ms delay, the 32× choice generally provides 3*32, or 96 ms nominal delay. However, the 32× choice may provide a delay range that may vary between 32 ms and 160 ms. For applications such as a wake-up from suspend (e.g., in USB mouse applications), the delay time is generally controlled as accurately as possible. The tuning scheme (e.g., programming) of the timer 100 may allow the delay of the circuit 100 to be tuned to within ±35% of the desired delay range. Typical representative default wake-up times are shown in TABLE 1 below. The setting column may show different configurations of the signal ADJUST[3:1].

TABLE 1

| Setting | Wake-up scale | Min Time (ms) | Max Time (ms) |
|---------|---------------|---------------|---------------|
| 1 | 1x | 1 | 5 |
| 2 | 2x | 2 | 10 |
| 3 | 4x | 4 | 20 |
| 4 | 8x | 8 | 40 |
| 5 | 16x | 16 | 80 |
| 6 | 32x | 32 | 160 |
| 7 | 64x | 64 | 320 |
| 8 | 126x | 128 | 640 |

For a 100 ms desired delay time, the useful range choices may be implemented by tuning to the best range. A predefined limit (e.g., between 64 ms and 128 ms or between setting 7 and 8) may represent a fastest condition or a predefined limit (e.g., between 80 ms and 160 ms or between settings 5 and 6) may represent a slowest condition. By selecting an optional setting (e.g., settings 1–8) for a particular device, the wake-up time error in a worst case scenario is normally less than ±35% from the desired time.

The wake-up time of the timer 100 may be tuned (e.g., programmed) by the signal ADJUST[3:1]. Additionally, the wake-up time for a device may be measured during a normal operation (e.g., non-suspended). The measurement of the wake-up time for a particular chip may be accomplished by (i) determining an initial wake-up setting, (ii) starting the wake-up timer 100 (which runs in either awake or suspended modes), (iii) determining a delay time between enabling the wake-up timer 100 and an assertion of the signal OUTPUT and (iv) changing the initial wake-up setting in response to the delay time. The measured wake-up time may indicate a speed of the chip (under the current conditions). The timer 100 may allow a user and/or appropriate firmware to select the best wake-up setting for the particular chip. The wake-up setting may be stored in a register and presented as the signal ADJUST[3:1] during suspend mode (if the circuit is enabled).

The wake-up time determination scheme may be repeated to account for changes in operating conditions. The timer 100 may implement alternate scale factors to the geometric wake-up scale factors (1×, 2×, . . . 128×). However, the alternate scale factors may have to trade-off range for resolution. For example, the scale factors may be increased to cover a greater range with a predetermined number of bits (e.g., 1×, 4×, 16×, 64×. . . ). However, the greater range has a trade-off of reduced resolution and accuracy.

Figure 3:
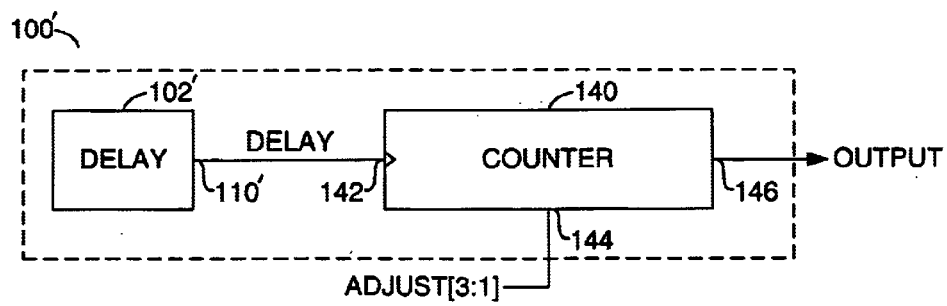
FIG. 3 is a block diagram of an alternate embodiment of the present invention.

Referring to FIG. 3, a block diagram of an alternate embodiment of the present invention marked with primed notation is shown. The circuit 100' may be similar to the circuit 100. The circuit 100' generally comprises the delay block 102' and a counter block (or circuit) 140. The delay block 102' may have the output 110' that may present the signal DELAY. The signal DELAY may be presented to an input 142 of the counter 140. An input 144 of the counter 140 may receive the signal ADJUST[3:1]. Additionally, the counter 140 may have an output 146 that may present the signal OUTPUT. In one example, the counter 140 may be implemented as a down counter. In another example, the counter 140 may be implemented as an up counter. However, the counter 140 may be implemented as another appropriate type or configuration of counter in order to meet the criteria of a particular implementation.

The delay circuit 102' may clock the counter 140. The delay counter 102' may clock the counter with the delay clock DELAY. An initial count of the counter 140 may be provided by the signal ADJUST[3:1]. The counter 140 may count UP/DOWN in response to the signal DELAY. The counter 140 may count from the initial value determined from the signal ADJUST[3:1]. The initial value of the signal ADJUST[3:1] may be programmed. Additionally, the initial value may be programmed by a user. When the counter 140 reaches a predetermine value determined by the signal ADJUST[3:1], the counter 140 may assert the signal OUTPUT. For example, the counter 140 may start from an initial value determined by the signal ADJUST[3:1] and count up/down to a target value (e.g., 0 or 7). Additionally, the counter 140 may start from an initial value (e.g., 0 or 8) and count up/down to a target value determined by the signal ADJUST[3:1]

The counter 140 may reload to the initial count value each time the counter 140 counts to the predetermined value. The circuit 100' may allow delay time selections to be linear (e.g., 1×, 2×, 3×, 4×, etc.). The circuit 100' may provide increased resolution (e.g., smaller step size). However, the circuit 100' may proved a smaller total delay range for a given number of input signals.

The tuning scheme (e.g., programming) of the timer 100 may allow the delay of the circuit 100' to be tuned to within ±30% of the desired delay range. Typical representative default wake-up times are shown in TABLE 2 below. The setting column may show different configurations of the signal ADJUST[3:1].

TABLE 2

| Setting | Wake-up scale | Min Time (ms) | Max Time (ms) |
|---|---|---|---|
| 1 | 1× | 1 | 5 |
| 2 | 2× | 2 | 10 |
| 3 | 3× | 3 | 15 |
| 4 | 4× | 4 | 20 |
| 5 | 5× | 5 | 25 |
| 6 | 6× | 6 | 30 |
| 7 | 7× | 7 | 35 |
| 8 | 8× | 8 | 40 |

For a 7.5 ms desired delay time, the useful range choices may be implemented by tuning to the best range. A predefined limit (e.g., between 7 ms and 8 ms or between setting 7 and 8) may represents a fastest condition or a predefined limit (e.g., between 5 ms and 10 ms or between settings 1 and 2) may represent a slowest condition. By selecting an optional setting (e.g., settings 1–8) for a particular device, the wake-up time error in a worst case scenario is normally less than ±30% from the desired time.

Figure 4:
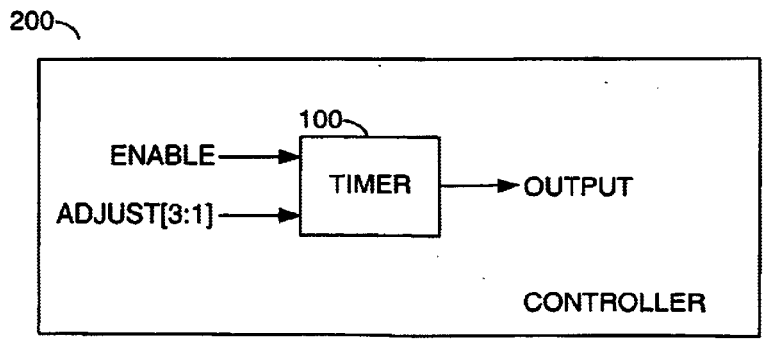
FIG. 4 is a block diagram of an implementation of the present invention.

Referring to FIG. 4, an implementation of the timer 100 (or 100') is shown. In one implementation, the timer 100 may be implemented within a controller 200. The controller 200 may be implemented as, in one example, a microcontroller. However, the controller 200 may be implemented as other appropriate type device in order to meet the criteria of a particular implementation. The timer 100 may operate internally to the microcontroller 200. The microcontroller 200 may provide the signal ENABLE and the signal ADJUST[3:1]. Additionally, the microcontroller 200 may receive the signal OUTPUT. The signal OUTPUT may be implemented as a wake-up signal for the microcontroller 200.

The timer 100 may implement, in one example, a fully internal wake-up timer (e.g., a timer within a microcontroller that does not require additional pins or external devices to operate). The wake-up timer 100 may retain a wide range of wake-up times and provide accurate tuning of the wake-up times. Additionally, the timer 100 may provide an area efficient circuit with low power consumption.

The wake-up timer 100 may be implemented in circuits, such USB microcontrollers, to solve conflicting demands over desired wake-up times. However, the wake-up timer 100 may be implemented in a number of design implementations. For example, the delay circuit 102 may be implemented as any type of low power oscillator circuit to provide an appropriate base delay of a particular implementation. Additionally, the timer 100 may be auto-calibrated by appropriate firmware to select an accurate target delay time.

The function performed by the timer 100 of FIGS. 1 and 3 and 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention thus may also include a computer product which may be a storage medium including instructions which can be used to program a device to perform a process in accordance with the present invention. The storage medium can include, but is not limited to, any type of ROM, RAM, EPROM, EEPROM, Flash memory, or any type of media suitable for storing electronic instructions. The present invention may also be implemented by the preparation of ASICs, FPGAs, or by interconnecting an appropriate network of conventional component circuits, as is described herein, modifications of which will be readily apparent to those skilled in the art(s).

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a timer circuit configured to present any of a plurality of divided delay signals as a wake-up signal in response to an input signal and an enable signal; and
   a microcontroller configured (i) to exit a suspend or sleep mode in response to said wake-up signal and (ii) to generate said input signal and said enable signal, wherein (i) said input signal comprises a programmable delay value and (ii) said microcontroller is configured to determine said programmable delay value during an awake mode by (a) initially setting said programmable delay value to a predetermined delay value, (b) starting said timer circuit, (c) measuring a delay time between enabling said timer circuit and assertion of said wake-up signal and (d) adjusting said programmable delay value based on said measured delay time.

2. The apparatus according to claim 1, wherein said input signal comprises a user programmable signal.

3. The apparatus according to claim 1, wherein said input signal comprises a multi-bit signal.

4. The apparatus according to claim 1, wherein said programmable delay value is determined by said microcontroller in response to one or more firmware instructions.

5. The apparatus according to claim 1, wherein said programmable delay value comprises a wake-up delay timing value.

6. The apparatus according to claim 1, wherein said timer circuit comprises:
   a delay circuit configured to generate a delay signal; and
   a select circuit configured to (i) generate said plurality of divided delay signals and (ii) present said wake-up signal in response to said delay signal and said input signal.

7. The apparatus according to claim 6, wherein said input signal is configured to control selection of one of said plurality of divided delay signals for presentation as said wake-up signal.

8. The apparatus according to claim 7, wherein each of said divided delay signals has a period that comprises a multiple of a period of said delay signal.

9. The apparatus according to claim 6, wherein said select circuit is configured to multiplex said plurality of divided delay signals in response to said input signal.

10. The apparatus according to claim 6, wherein said select circuit comprises:
    a divider circuit configured to generate said plurality of divided delay signals in response to said delay signal; and
    a multiplexer configured to present said wake-up signal in response to said plurality of divided delay signals and said input signal.

11. The apparatus according to claim 1, wherein said timer circuit comprises a counter configured to generate each of said plurality of divided delay signals in response to a different value of said input signal.

12. The apparatus according to claim 6, wherein said delay circuit is further configured to present said delay signal in response to said enable signal.

13. The apparatus according to claim 1, wherein said input signal is generated in response to a value stored in a register of said microcontroller.

14. The apparatus according to claim 1, wherein said timer circuit and said microcontroller are implemented on a single integrated circuit.

15. The apparatus according to claim 1, wherein (i) said timer circuit is configured to periodically wake up said microcontroller and (ii) a sleep period of said microcontroller is determined by said programmable delay value.

16. The apparatus according to claim 1, wherein said microcontroller is further configured to repeatedly adjust said programmable delay value of said input signal in response to a comparison between said predetermined delay value and a subsequently measured delay time.

17. An integrated circuit comprising:
    a controller configured (i) to operate in a sleep mode and a wake-up mode and (ii) to generate an enable signal and an adjust signal, wherein said controller is configured to determine said adjust signal during said wake-up mode by (a) initially setting said adjust signal to a predetermined delay value, (b) starting a timer circuit, (c) measuring a delay time between enabling said timer circuit and a wake-up signal and (d) changing said adjust signal based on said measured delay time; and
    said timer circuit configured to control switching of said controller from said sleep mode to said wake-up mode after a programmable period of time, wherein said timer circuit comprises (i) a delay block configured to generate a delay signal in response to said enable signal and (ii) a divider circuit configured to generate a plurality of divided delay signals in response to said delay signal, where said plurality of divided delay signals determine a range of said programmable period of time and said timer circuit is configured to select one of said plurality of delay signals as said wake-up signal in response to said adjust signal.

18. The integrated circuit according to claim 17, wherein said controller is configured to determine a value for said adjust signal that produces said programmable period of time.

19. A method for adjusting wake-up timing comprising the steps of:
    (A) receiving an input signal and an enable signal from a microcontroller;
    (B) generating a delay signal in response to said enable signal;
    (C) generating a wake-up signal by dividing said delay signal according to a value of said input signal; and
    (D) waking-up said microcontroller in response to said wake-up signal, wherein (i) said input signal comprises a programmable delay value and (ii) said microcontroller is configured to determine said programmable delay value during an awake mode by (a) initially setting said programmable delay value to a predetermined delay value, (b) enabling generation of said wake-up signal, (c) measuring a delay time between enabling generation of said wake-up signal and assertion of said wake-up signal and (d) adjusting said programmable delay value based on said measured delay time.

20. The method according to claim 19, wherein said input signal comprises a user programmable signal and said programmable delay value comprises a wake-up timing value.

21. The method according to claim 19, wherein said programmable delay value is determined in response to execution of one or more computer executable instructions stored in a computer readable medium.

22. The method according to claim 19, further comprising the steps of:
- generating a plurality of divided delay signals in response to said delay signal; and
- selecting one of said divided delay signals as said wake-up signal in response to said programmable delay value.

23. The method according to claim 19, wherein step (C) further comprises the sub-step of:
- programming a counter in response to said programmable delay value and clocking said counter in response to said delay signal.

24. The method according to claim 19, further comprising the step of:
- repeating said adjustment of said value of said input signal to account for chances in operating conditions.

25. The method according to claim 19, wherein said microcontroller is further configured to repeat the steps comprising:
- setting said programmable delay value to said predetermined delay value;
- enabling generation of said wake-up signal in response to said programmable delay value;
- measuring said delay time between enabling generation of said wake-up signal and assertion of said wake-up signal; and
- adjusting said programmable delay value in response to a result of comparing said measured delay time with a predetermined wake-up delay time corresponding to said predetermined delay value.

* * * * *